Dec. 12, 1950     G. C. GEYER     2,533,927
WEAR TAKE-UP MEANS FOR WHEEL BRAKES

Filed May 20, 1947     2 Sheets-Sheet 1

INVENTOR.
George C. Geyer,
BY George D. Richards
Attorney

Dec. 12, 1950     G. C. GEYER     2,533,927
WEAR TAKE-UP MEANS FOR WHEEL BRAKES
Filed May 20, 1947     2 Sheets-Sheet 2

INVENTOR.
George C. Geyer,
BY
George D. Richards
Attorney

Patented Dec. 12, 1950

2,533,927

UNITED STATES PATENT OFFICE 2,533,927

WEAR TAKE-UP MEANS FOR WHEEL BRAKES

George C. Geyer, Hillside, N. J.

Application May 20, 1947, Serial No. 749,249

1 Claim. (Cl. 188—79.5)

This invention relates to improvements in automatic wear take-up means for wheel brakes, and, more particularly, to novel means for such purpose which is especially well adapted for use in connection with automobile wheel brakes.

The invention has for an object to provide, for use in brake mechanism having two or more brake shoes, a simple self-acting means for each said shoe, whereby to automatically and independently compensate alterations of the throw of each brake shoe due to wear of the brake linings with which the operative faces of the shoes are furnished, and thus to constantly maintain a uniform predetermined clearance between the brake drum and the respective brake shoes, when the latter are disposed in released relation to the former; thus preventing variation in the distance of throw of the brake shoes and the actuating means therefor, to the end that dependable and efficient braking action is constantly assured.

Another object of the invention is to provide a novel arrangement and construction of automatic brake wear take-up means, whereby each brake shoe is automatically adjusted relative to the brake drum independently of the other or others, so that any tendency to displacing shift of the brake shoe system as a whole relative to the opposed brake drum surface is avoided.

Other objects of this invention, not at this time more particularly enumerated, will be understood from the following detailed description of the same.

Illustrative embodiments of the invention are shown in the accompanying drawings, in which.

Similar characters of reference are employed in the above described views, to indicate corresponding parts.

Figure 1:
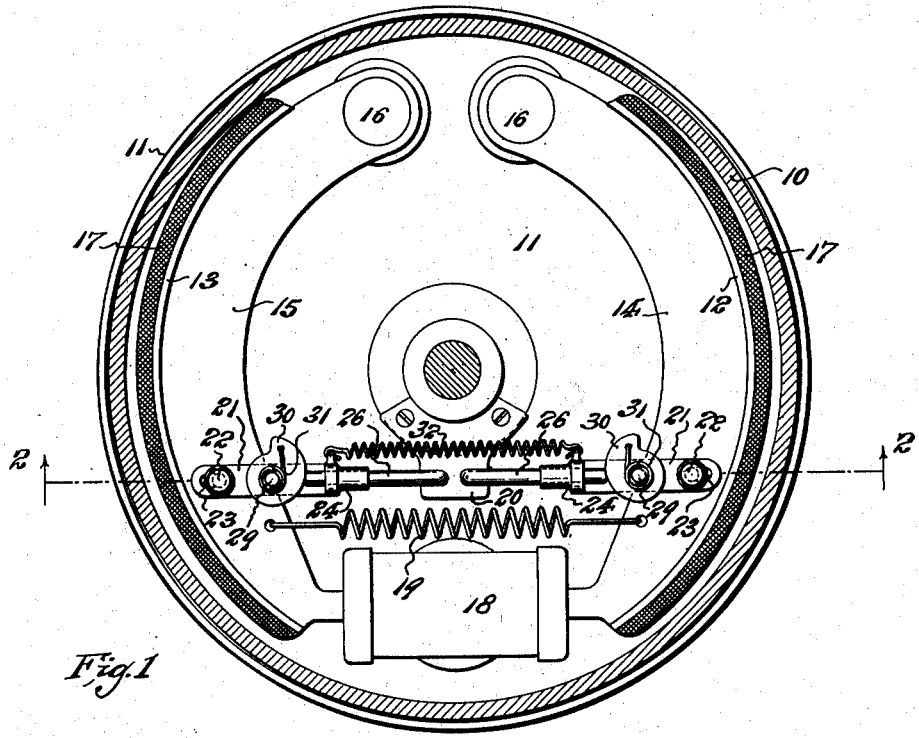
Fig. 1 is an elevational view of the interior of a one-cylinder operated brake mechanism, the brake shoes of which are each equipped with novel automatic brake wear take-up means according to the present invention, parts being shown in section, and the brake shoes being shown in normal released position.
Figure 2:
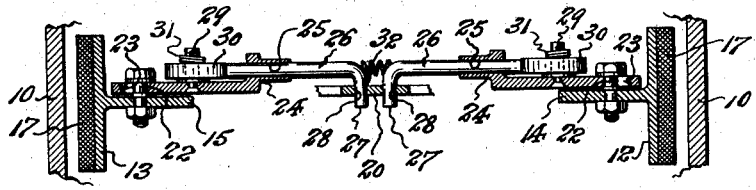
Fig. 2 is a fragmentary transverse sectional view, taken on line 2—2 of Fig. 1.

Referring to Figs. 1 and 2, the reference character 10 indicates the rotatable brake drum of the brake mechanism, and 11 indicates the stationary plate of said brake mechanism. Arranged and opposed to the interior surface of the brake drum 10 are a pair of oppositely extending brake shoes 12 and 13, the same being respectively provided with webs or flanges 14 and 15. Said brake shoes are pivotally mounted upon the stationary plate 11 by means of pivoting studs 16 which support the upper ends of the said brake shoe flanges 14 and 15. Each brake shoe is faced with a suitable brake lining material 17 which is adapted to frictionally engage the brake drum surfaces, when the brake shoes are operatively thrust into engagement with the latter. Suitable means for throwing the brake shoes into operative engagement with the brake drum is mounted on the stationary plate 11 in position to operatively engage with the free ends of said brake shoe webs or flanges 14 and 15. Said operating means may be of any known type, but is illustratively shown in Fig. 1 as comprising a hydraulic cylinder and piston operator 18 of the single cylinder type. Pull spring means 19 is interconnected between the brake shoe webs or flanges to yieldably retract and hold the brake shoe in released positions subject to actuation of the operator 18.

Each brake shoe is provided with compensating means which is solely or independently operative thereon for automatically taking up wear of its lining, whereby to stabilize the throw of the brake shoe as actuated by the operator 18. To this end, a stationary anchor bracket 20 is suitably affixed to the stationary plate 11 of the brake mechanism, so as to be disposed between the brake shoes 12 and 13. The novel compensating means for the brake shoe 12, according to the instant invention, is interconnected between the same and said anchor bracket 20, and comprises a link bar 21 which is coupled by its outer end portion to the flange 14 of said brake shoe 12. For this purpose, said flange 14 is provided with a rigid headed stop pin 22, which is suitably affixed to the same so as to project from a face thereof, and said outer end portion of the link bar 21 is provided with a longitudinal slot 23 through which said stop pin 22 extends whereby longitudinal play or movement of the brake shoe 12 relative to the link bar 21 is allowed for, which is sufficient to permit the brake shoe to move freely from and to brake released position. The inner or free end of the link bar 21 terminates in an angularly offset slide member 24 having an axial bore 25 aligned parallel to the longitudinal axis of said link bar. Said slide member 24 slidably engages over the outer free end portion of an anchoring rod 26. The inner end of said anchoring rod 26 terminates in an angular coupler arm 27 which engages through a receiving opening 28 provided therefor in said anchor bracket 20, whereby said anchoring rod is held against longitudinal movement. Rotatably mounted on a journaling stud 29, which is affixed to the link bar 21 intermediate its ends and so as to upstand therefrom, is a take-up cam 30. The periphery of said take-up cam 30 is opposed to the outer extremity of the anchoring rod 26 so as to be abutted thereby, whereby to resist contractive relative movement of the link bar 21 and anchoring rod 26. A torsional spring 31 is provided for rotating the take-up cam 30 in operative direction; the inner end of said spring being affixed to the journaling stud 29 and the outer end thereof to the take-up cam. Initially, the take-up cam is set to engage with the end of the anchoring rod 26 at substantially the point of its minimum radius, whereby the spring may rotate the cam to progressively oppose points of increasing radius to said end of the anchoring rod 26, to thereby cause progressive longitudinal expansion or extension of the stop linkage which is formed by the link bar 21 and the associated anchoring rod 26. Pull spring means 32 is connected to the link bar 21, whereby to yieldably urge the latter toward the anchoring rod 26, and thus to maintain the take-up cam 30 in constant link bar stopping engagement with the end of the anchoring rod 26. The compensating means for the brake shoe 13 is of the same construction as that above described for the brake shoe 12, and is interconnected between said brake shoe 13 and said anchor bracket 20, preferably in alignment with said compensating means for the brake shoe 12. The pull spring 32 may comprise a single spring common to both compensating means, the same being interconnected between the link bars of said compensating means, as shown in Fig. 1.

In the operation of the wear compensating means in the control, for example, of the brake shoe 12, as the lining 17 of said shoe wears, the amplitude of brake shoe movement from released to brake drum engaging position will increase proportionately to the amount of such wear. When wear occurs, the resultant increased forward swinging movement of the brake shoe, necessary to operatively engage the lining with the brake drum, will carry the stop pin 22 of the brake shoe flange into engagement with the outer end of the slot 23 of the link bar 21, thereby exerting an outward pull upon the latter, which draws the same outwardly relative to the fixed or longitudinally immovable anchoring rod 26. Such outward movement of the link bar 21 continues until arrested by the braking engagement of the brake shoe lining 17 with the brake drum 10. Such outward movement of the link bar 21 tends to separate the take-up cam 30 from the extremity of the fixed anchoring rod 26. As such separation occurs, the tension of the torsion spring 31 operates to rotate the take-up cam so as to interpose between its axis and the extremity of the anchoring rod 26 an increased radial extent of said cam, whereby to hold the link bar 21 in an advanced position equal to the amount of brake shoe lining wear required to be compensated so as to reduce the throw of the brake shoe and stroke of the operator 18 and actuating means for the latter to the normal initial amplitude. Thereafter when the brake shoe 12 is again released, it will swing back, under the pull of the spring 32, until the stop pin 22 abuts the inner end of the slot 23 of said link bar 21, thus arresting rearward movement of the brake shoe 12 at a position so that the clearance between the worn lining thereof and the brake drum is equal to the predetermined initial clearance provided between said parts in their original condition.

It will be obvious that the corresponding wear compensating means which serves the opposite brake shoe 13 operates with respect thereto in the same manner as above described with respect to the brake shoe 12, but wholly independently of the wear compensating means of the latter. Since the wear compensating means of each brake shoe operates independently of the other, each said shoe is individually adjusted according to the particular amount of wear to which its lining is subjected, and, furthermore, all tendency to displacing shift of the brake shoe system as a whole relatively to the opposed brake drum surface is avoided.

Figure 3:
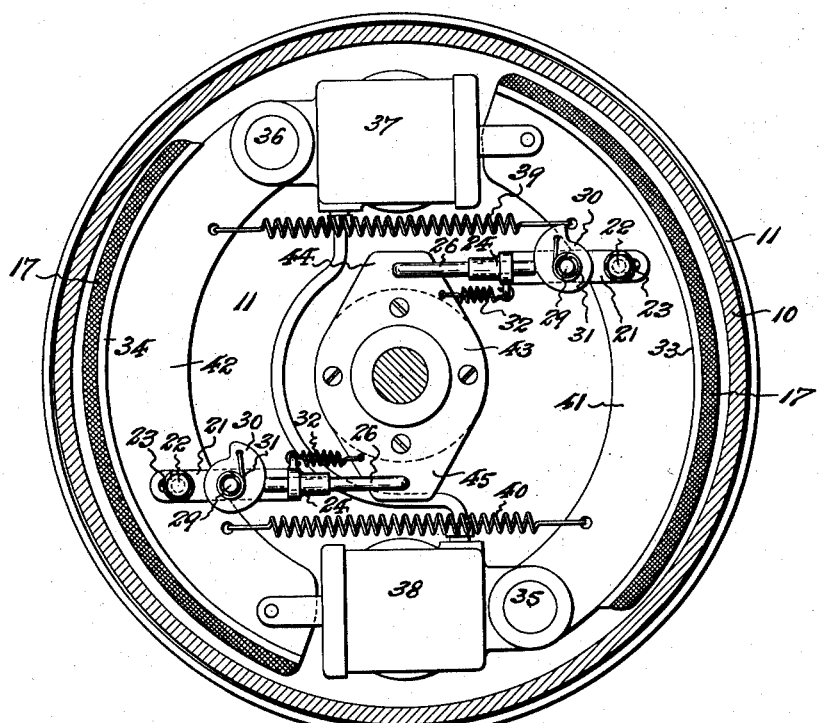
Fig. 3 is an elevational view of the interior of a two-cylinder operated brake mechanism, the brake shoes of which are each equipped with the automatic brake take-up means of this invention, parts being shown in section, and the brake shoes being shown in normal released position.

Since the novel wear compensating means of the instant invention is adapted to be applied to individual brake shoes, it will be obvious that the same may be efficiently used in a variety of types of brake mechanisms, regardless of either the number or relative arrangement of the brake shoes thereof. For example, said novel wear compensating means may be very satisfactorily used in brake mechanisms having a plurality of brake shoes each of which is actuated by its own individual operator. An example of this is shown in Fig. 3, wherein instead of one operator arranged to actuate two brake shoes, as in Fig. 1, each brake shoe is provided with its own operator. The brake mechanism shown in Fig. 3 comprises a brake drum 10, stationary plate 11, and two brake shoes 33 and 34 each having a lining 17. Said brake shoes 33 and 34 are respectively pivotally mounted at diametrically opposite points within the brake drum on their respective fulcrum elements 35 and 36. As thus mounted, the brake shoes both extend in the same direction, rather than in opposite direction, and, consequently, forward motion of the brake drum 10, when contacted thereby, tends to give each brake shoe a self-actuating action; an obvious advantage which is afforded by this type of brake mechanism. An operator 37, mounted on the stationary plate 11, is provided for connection with the free end of the brake shoe 33, and another like operator 38, also mounted on the stationary plate 11, is provided for connection with the free end of the brake shoe 34. Pull springs 39 and 40 are interconnected between the respective webs or flanges 41 and 42 of said brake shoes 33 and 34, whereby to yieldably retract and hold the latter in released positions subject to actuation by their respective operators 37 and 38. Suitably affixed to the stationary plate 11 is a modified form of anchor bracket 43 which provides oppositely extending projections 44 and 45. Interconnected between the web or flange 46 of the brake shoe 33 and the anchor bracket projection 43 is a wear compensating means according to this invention, and interconnected between the web or flange 41 of the brake shoe 34 and the anchor bracket projection 45 is a like wear compensating means. Said wear compensating means each comprise the structural arrangement already above described, as is evidenced by use of corresponding reference characters in Fig. 3 to identify the parts thereof. It will be obvious that said wear compensating means will function with respect to the respective brake shoes 33 and 34 in the same manner and with the same advantages of independent control as already hereinabove described.

Having now described my invention, I claim:

In a brake mechanism having a stationary plate and a rotatable brake drum, brake shoes pivotally mounted on said plate in opposition to said drum, and means to move said shoes into and out of engagement with said drum, the combination therewith of an anchor bracket affixed to said plate intermediate said shoes, and wear take-up means interposed between said shoes and the anchor bracket and being so constructed and arranged as to adjust each of said shoes relative to the brake drum independently of the other shoe and thereby avoid displacement of the brake shoe system as a whole relative to the opposed brake drum surface, said wear take-up means comprising separate expansible linkage for each of the respective brake shoes including an elongated movable link member having one end anchored to said anchor bracket, an elongated movable link member telescopically engaged with said immovable member and having a lost motion connection with the brake shoe whereby to permit normal movement of the latter toward and away from the drum, spring means tending to resist expansion of the linkage, and a spring rotated take-up cam mounted on the immovable link member to oppose and constantly engage the free end of said immovable link member and thereby check retrograde contraction of the linkage, said spring means for resisting expansion of the linkage being in the form of a single contractible spring directly interconnecting the opposed ends of the movable link members of both separate sets of linkage and thereby causing the free ends of the immovable link members to exert constantly equalized frictional bearing pressure on the respective take-up cams.

GEORGE C. GEYER.

REFERENCES CITED

The following references are of record in the file of this patent:

UNITED STATES PATENTS

| Number | Name | Date |
|---|---|---|
| 1,848,259 | McConkey | Mar. 8, 1932 |
| 2,027,202 | Runyan | Jan. 7, 1936 |
| 2,195,261 | Rasmussen et al. | Mar. 26, 1940 |
| 2,210,336 | Payne | Aug. 6, 1940 |
| 2,236,777 | Ludwig | Apr. 1, 1941 |
| 2,414,037 | Geyer | Jan. 7, 1947 |